Aug. 29, 1944.  E. A. KEELER  2,357,205
MEASURING AND CONTROL APPARATUS
Filed Nov. 16, 1940  2 Sheets-Sheet 2
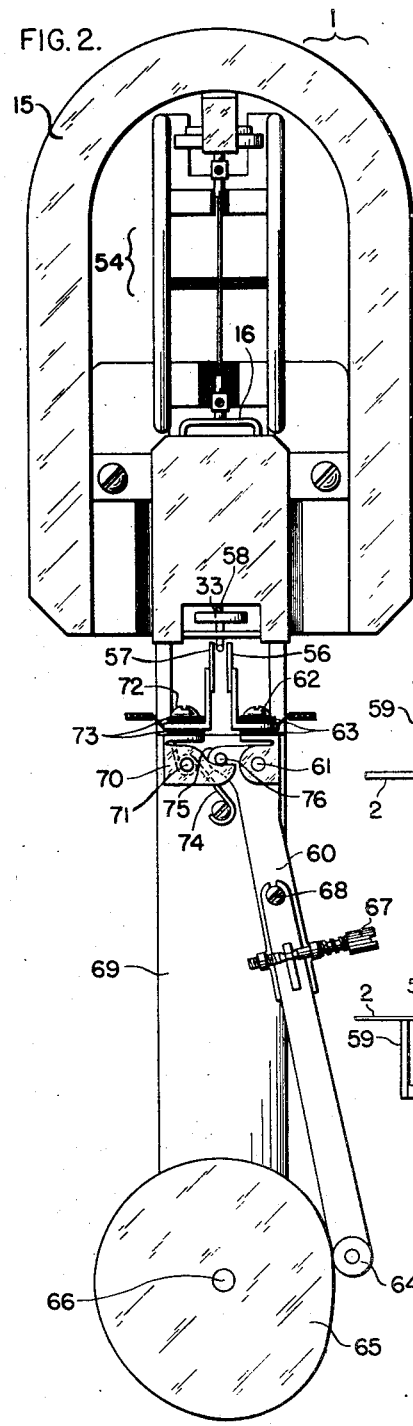
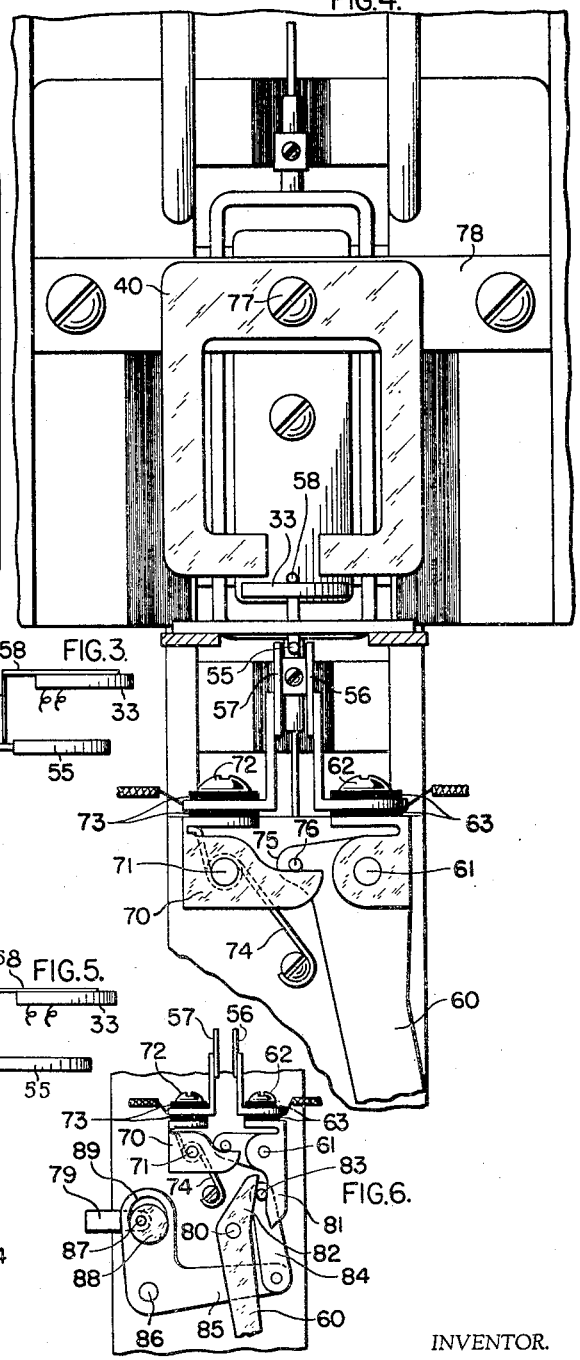
INVENTOR.
EARL A. KEELER
BY C. B. Spangenberg
ATTORNEY Patented Aug. 29, 1944

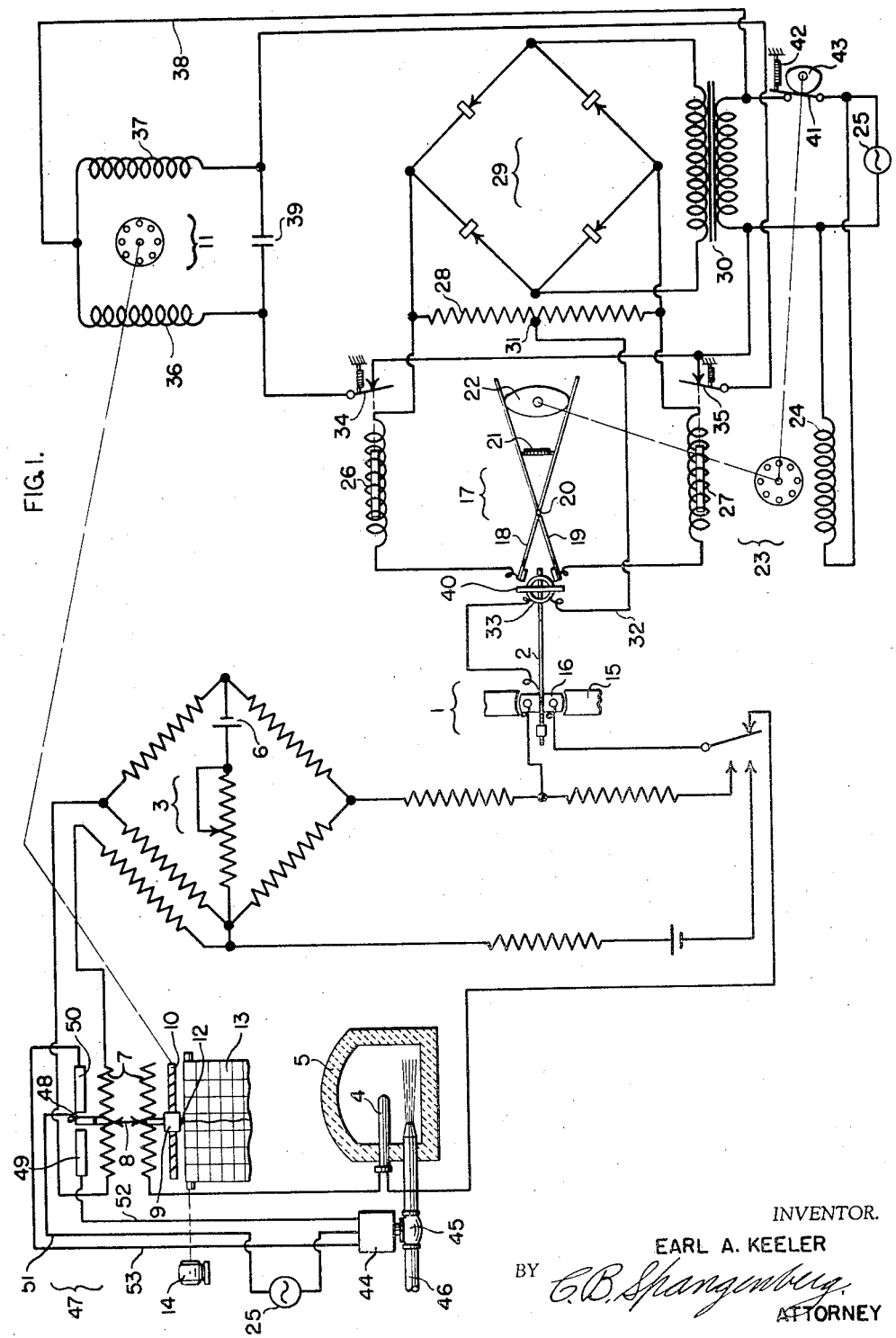

2,357,205

UNITED STATES PATENT OFFICE 2,357,205

MEASURING AND CONTROL APPARATUS

Earl A. Keeler, Norristown, Pa., assignor to The Brown Instrument Company, Philadelphia, Pa., a corporation of Pennsylvania Application November 16, 1940, Serial No. 365,866

16 Claims. (Cl. 171—95)

The present invention relates to improvements in automatic measuring and controlling apparatus.

More particularly, the invention relates to apparatus for ascertaining the magnitude, or changes in magnitude, of a condition under measurement such as a mechanical, electrical, physical or chemical condition, for example, and including suitable provisions for making a record of the magnitude, or changes in magnitude, of the condition and/or for maintaining the condition at a predetermined and desired value. The invention has especial utility in pyrometric recording and controlling systems wherein it is desired to record and control the conditions of temperature at one or more remote points, for example, in furnaces or in kilns.

An object of the present invention is to provide improved apparatus for measuring and/or controlling the magnitude of a variable condition which is quick in response and inherently stable in operation.

A more specific object of the invention is to provide improved apparatus for measuring and/or controlling the magnitude of the temperature in a furnace or kiln which is rapid in action and does not overrun or hunt.

Another specific object of the present invention is to provide an improvement in measuring and/or controlling apparatus of the potentiometric and analogous types in which a contact engaging a resistance included in a measuring circuit is automatically adjusted along said resistance, under control of a galvanometer, as required to balance the electromotive force of a thermocouple, or other potential to be measured, against the potential drop in a portion of the measuring circuit including more or less of said resistance.

In accordance with the present invention, a normally balanced electrical network becomes unbalanced upon change in the magnitude of a variable condition under measurement and controls the operation of a driving system, including a reversible electrical motor, through the medium of a sensitive galvanometer having a deflecting pointer for effecting a rebalancing adjustment of the network. The operation of the reversible motor is controlled by the deflections of the galvanometer pointer in such a manner that the driving system effects rebalance of the network in a minimum of time without overshooting the position of balance of the network.

Specifically, the present invention resides in apparatus of the type referred to wherein there is employed as a control element the deflecting pointer of a sensitive galvanometer coacting with cyclically operable means disposed on opposite sides of the pointer for engaging the galvanometer pointer and effecting a return movement of the latter to a normal, neutral position upon deflection therefrom, whereby an electrical control is effected during a portion of each cycle of operation of the cyclically operable means, the magnitude of which portion of each cycle being determined by the extent of deflection of the galvanometer pointer from its normal, neutral position.

The invention resides further in apparatus of the character referred to wherein the galvanometer is provided with two movable coils, one of which is connected in the measuring circuit and controls the deflection of the pointer, and the other of which is carried by the pointer and operates to add an additional force to that of the first coil for increasing the contact pressure between the pointer and the cyclically operating means upon engagement of the latter to thereby effect positive operation of the electrical control upon each engagement of the galvanometer pointer and the cyclically operable means.

The invention also resides in apparatus of the type referred to wherein means are provided for interrupting the electrical control circuit independently of the galvanometer pointer substantially at the time the latter has been returned to its normal, neutral position by the cyclically operable means.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a diagrammatic representation of one form of my present invention;

Fig. 2 illustrates a preferred embodiment of the galvanometer and the galvanometer pointer contacting structure which may be utilized in the arrangement of Fig. 1;

Figs. 3 and 4 show in detail enlarged views of portions of the preferred structure shown in Fig. 2;

Fig. 5 illustrates an alternative arrangement of the structure shown in Fig. 3; and Fig. 6 illustrates a modification of a portion of the structure shown in Fig. 2.

In Fig. 1 I have illustrated more or less diagrammatically a galvanometer 1, having a deflectable pointer 2, which is adapted to respond to unbalance in a null point potentiometric measuring circuit 3 to produce deflection of the pointer 2 from a normal neutral or zero position. The potentiometric measuring circuit 3 may be of any suitable type, such for example, as the Brown potentiometer circuit disclosed in the Harrison Patent 1,898,124, issued February 21, 1933. Such measuring circuits are well known, and it is sufficient for the present purposes to note that the potentiometric circuit includes a circuit branch in which a source of variable potential to be measured is connected. The source of variable potential in the present instance is that produced by a thermocouple 4 which is positioned within a furnace 5 the temperature of the interior of which is to be measured. The potentiometric circuit also includes an opposing circuit branch including a source of known potential such as that produced by a battery 6, resistors 7, a variable portion of the latter of which may be connected into an opposed branch by means of a sliding contact 8 whereby the respective effects of the variable and known sources are made equal and opposite. The galvanometer moving coil is then rendered undeflected when the circuit is balanced for a given value of the electromotive force developed by the thermocouple 4 with the contact 8 in a corresponding position along the resistors 7. The position of the contact 8 is then a measure of the value of the electromotive force produced by the thermocouple, and may serve as a measure of the temperature to which the thermocouple is exposed.

My invention is specifically concerned with the manner and the means by which the contact 8 is adjusted back and forth along the resistances 7 in response to deflection of the galvanometer pointer 2 from its normal, neutral position. As illustrated, the contact 8 is mounted on and is movable with a carriage 9 and thereby the contact 8 is shifted back and forth along the resistor 7 upon rotation of the threaded shaft 10. The shaft 10 is mechanically connected in any suitable manner to the shaft of a reversible electrical motor 11 which is adapted to be selectively energized for rotation in one direction or the other by means to be described upon deflection of the galvanometer pointer 2 from its normal, neutral position.

If desired, a pen 12 may also be mounted on the carriage 9 which carries the potentiometer contact 8 and arranged in cooperative relation with a recorder chart 13 provided with calibration marks in terms of the temperature to which the thermocouple 4 is exposed. When such provision is made a continuous record of the temperature of the interior of the furnace 5 may be obtained. The chart 13 may be a strip chart as shown and is adapted to be driven in any convenient manner as, for example, by a unidirectional motor 14 through siutable gearing (not shown) so that a record of the temperature to which the thermocouple 4 is subjected will be recorded as a continuous line on the chart 13. It will be apparent that, if desired, a circular chart having non-rectangular coordinates may be utilized instead of a strip chart for recording the temperature within the interior of the furnace 5.

The method and the means by which the extent of deflection of the galvanometer pointer 2 from its normal, neutral position is determined comprises an important feature of my present invention and will now be described. As illustrated more or less diagrammatically in Fig. 1, the galvanometer 1 includes a permanent magnet 15 having north and south pole pieces between which the movable coil 16 of the galvanometer is positioned. The coil 16 of the galvanometer is connected in the potentiometric measuring circuit and responds upon unbalance of the latter to deflect the pointer 2 from its normal, neutral position. The end of the pointer 2 is disposed in cooperative relation with a scissors type clamping arrangement 17 comprising blades 18 and 19 adjacent ends of which are positioned on opposite sides of the pointer 2. The scissors arrangement 17 is pivoted on a shaft 20, and the blades 18 and 19 thereof are biased by a spring 21 into a position wherein they clamp the pointer 2 between adjacent ends thereof, and are adapted to be actuated away from that position to thereby release the galvanometer pointer 2 by a cam 22. The cam 22 is mounted on the shaft of a unidirectional electrical motor 23 and is continuously rotated by the latter during the normal operation of the instrument. The motor 23 includes a winding 24 which receives energizing current from an alternating current source 25.

When the galvanometer pointer 2 is in its normal, neutral position, the contact blades 18 and 19 of the scissors arrangement 17 will engage the pointer 2 from opposite sides at substantially the same instant and accordingly will not disturb the position of said pointer. If, however, during the time the ends of the blades 18 and 19 are separated, the pointer 2 of the galvanometer is deflected away from its normal, neutral position, for example, in a clockwise direction, the blade 19 on being moved towards the pointer 2 will physically engage the latter and move said pointer along with it until the pointer has been returned to its normal, neutral position wherein it is engaged by both of the blades 18 and 19. Similarly, upon deflection of the galvanometer pointer 2 in the counter-clockwise direction from its neutral position, the blade 18 will engage the pointer and move it along with it in the opposite direction until the pointer is engaged by both of the blades 18 and 19. The scissors arrangement 17 thus operates to restore the galvanometer pointer 2 to its normal, neutral position upon deflection of the latter therefrom.

As shown, the ends of the blades 18 and 19 which are adapted to engage the galvanometer pointer 2 are insulated from the main body of the blades and are connected to one end of a respective relay coil 26 and 27. The other end of the relay 26 is connected to one end of a resistance 28 and the other end of the relay coil 27 is connected to the other end of the resistance 28. A direct current voltage is maintained across the terminals of the resistance 28 by means of a full wave rectifier 29 which may be of the copper oxide type and energized from the alternating current supply source 25 through a transformer 30. A point 31 intermediate the ends of the resistance 28 is connected by a conductor 32, in which a coil 33 is inserted, to the galvanometer pointer 2. A normally closed switch 34 is associated with the relay coil 26 and is adapted to be opened upon energization of the latter. Similarly, a normally closed switch 35 is associated with the relay coil 27 and is adapted to be opened upon energization of said coil 27.

In accordance with my present invention, the relay coils 26 and 27 are adapted to be selectively energized upon deflection of the galvanometer pointer 2 from its normal, neutral position for a variable portion of each cycle of the operation of the scissors arrangement 17 determined by the extent of deflection of the pointer 2 from its neutral position. The relay coils 26 and 27 are adapted, when energized under control of the galvanometer pointer 2, to open the normally closed switches 34 and 35, respectively, and thereby to control the selective energization of the reversible electrical motor 11 for rotation in one direction or the other.

As illustrated, the motor 11 is of the induction type and includes a pair of opposed field windings 36 and 37. One end of each of the windings 36 and 37 is connected by a conductor 38 to one side of the alternating current supply source 25 and the other ends of the motor windings are adapted to be connected by a respective switch 34 and 35 to the other side of the alternating voltage supply source. A condenser 39 of suitable value is connected between the last mentioned terminals of the motor windings 36 and 37.

When both of the switches 34 and 35 are closed the motor windings 36 and 37 will both be directly connected to the alternating voltage supply source 25 and the motor rotor will not be actuated for rotation. When one switch 34 is open, however, the motor winding 36 will be connected to the alternating voltage supply source through the condenser 39. The energizing current to the motor winding 37 then will be in phase with the voltage of the supply source 25 while the energizing current to the motor winding 36 will lead the voltage of the supply source. This sets up a rotating field in the rotor of the motor in one direction and thereby actuates the latter for rotation in a corresponding direction. Upon opening of the switch 35, the switch 34 being closed, the current supplied the motor winding 37 will lead that supplied the motor winding 36, and accordingly a rotating field will be set up in the opposite direction in the motor, which rotating field actuates the motor rotor for rotation in the opposite direction. Thus, upon a change in the electromotive force developed by the thermocouple 4 and consequent unbalance of the potentiometric network 3, the reversible electrical motor is selectively energized for rotation in one direction or the other to shift the carriage 9 and thereby the contact 8 in the proper direction along the resistor 7 to rebalance the potentiometric circuit.

As will be readily apparent to those skilled in the art, the potentiometric unbalanced electromotive force produced by a change in electromotive force developed by the thermocouple 4 in response to a furnace temperature change is slight and consequently the torque produced by the galvanometer 1 to deflect the pointer 2 is very small. The torque exerted by the galvanometer 1 to press the pointer 2 into engagement with the scissors blade 18 or 19 is ordinarily so small that the electrical current passed between the pointer 2 and the scissors blades 18 and 19 is insufficient to operate the relay coils 26 and 27. That is to say, while some current will pass between the galvanometer pointer 2 and the scissors blades, this current is so small that it is ineffective to cause the relay coils 26 and 27 to open switches 34 and 35.

In accordance with my present invention, this difficulty is overcome by providing the coil 33 on the end of the galvanometer pointer 2, and by providing a permanent magnet 40 adjacent the coil 33 with one pole of the permanent magnet 40 disposed on one side of the pointer 2 and the other pole of the magnet disposed on the other side. The current which flows through the relay coils 26 or 27 upon engagement of the pointer 2 with the scissor blades 18 or 19 flows through the coil 33. This flow of current through the coil 33, although it is small in magnitude, will establish an electrical field about the coil, which field reacts with that set up by the permanent magnet 40 to increase the contact pressure between the galvanometer pointer 2 and the scissors blade 18 or 19 with which the pointer is then in engagement. This increase in pressure between the galvanometer pointer 2 and the blade in engagement therewith produces a greater current flow between the contacts, and this increased current, in turn, operates the coil 33 to effect a further increase in the contact pressure. The current flowing though the relay coils 26 and 27 thus builds up until it is sufficient to energize the relay coil to the extent required to open its associated switch. When the switch opens the motor 11 will be selectively energized for rotation in one direction or the other and will rotate the shaft 10 in the proper direction to effect a rebalancing adjustment of the contact 8.

The motor 11 is energized for rotation for a portion of each cycle of the operation of the scissors arrangement 7 depending upon the extent or deflection of the galvanometer pointer 2. That is to say, when the galvanometer pointer 2 is deflected to a considerable extent, engagement between the then cooperating blade and the galvanometer pointer 2 will occur sooner than it will when the galvanometer pointer is only slightly deflected. The energization of the motor is terminated when the galvanometer pointer 2 has been restored to its normal, neutral position and is engaged by both of the blades 18 and 19. When this latter condition obtains both of the relay coils 26 and 27 will be simultaneously actuated whereby the motor 11 will be deenergized for rotation. In addition, the contact pressure increasing coil 33 will then be deenergized.

Substantially at the time when the galvanometer pointer 2 is engaged by both of the switch blades 18 and 19, the relay coils 26 and 27 are deenergized by means independent of the galvanometer pointer 2. This means comprises an intermittently operated switch 41 connected in the conductor supplying current to the transformer 30 from the alternating current supply source 25. The switch 41 is biased by a spring 42 to its open position and is actuated by a cam 43 to its closed position. The cam 43 is driven by the unidirectional motor 23 and accordingly is operated in synchronism with the cam 22 which actuates the scissors arrangement 17. As shown, the switch 41 may be so positioned as to also intermittently cut off the supply of current to the reversible electrical motor 11. It is noted that by providing a switch 41 the establishment of large and thereby destructive currents between the galvanometer pointer 2 and the scissor blades 18 and 19 upon separation of the pointer 2 from the scissor blades is prevented. The cam 43 is so configured as to open the switch 41 substantially at the time of closure of the scissor blades 18 and 19 into engagement with the galvanometer pointer 2 and to close the switch 41 when the scissor blades 18 and 19 have separated to their widest degree of separation. It will be apparent that if desired the cam 43 may be so configured as to close the switch 41 immediately upon separation of the scissor blades 18 and 19 from the galvanometer pointer 2.

While the coil 33 for increasing the contact pressure between the galvanometer pointer 2 and the switch blade 18 or 19 by which it is engaged has been shown as mounted on the end of the galvanometer pointer 2, it will be apparent that, if desired, the coil 33 may be wound on the same form as the galvanometer coil 16 as shown in my copending application, Serial No. 232,586, filed September, 1938, and issued into Patent 2,272,914 on February 10, 1944. When the contact pressure increasing coil 33 is disposed on the same form as the galvanometer coil 16, the permanent magnet 40 may be dispensed with. When the galvanometer 1 is of the suspension type I prefer to utilize the coil 33 and the permanent magnet 40 as shown in Fig. 1 since this arrangement operates to increase the contact pressure without causing a shift in the position of the axis of rotation of the galvanometer coil 16. There is a tendency to such shift when the contact pressure increasing coil is disposed on the same form as the galvanometer coil 16.

It will be apparent that the supply of heating agent to the furnace 5 may be controlled in accordance with the deflections of the pen 12 along the chart 13. For example, a reversible electrical motor 44 having two opposed field windings (not shown) may be utilized to adjust a fuel valve 45 disposed in a pipe 46 which supplies fuel to the furnace 5. To this end the reversible motor 44 is energized for rotation in one direction or the other depending upon the direction of deflection of the pen 12 from a predetermined position along the chart 13, which position corresponds to the temperature it is desired to maintain within the furnace.

Specifically, a switch 47 which is actuated in accordance with the adjustments of the pen 12 is provided for controlling the energization of the motor 44. The switch 47 includes a switch arm 48 which is insulated from but is carried by the same support which carries the pen 12 and the contact 8, and also includes two elongated contact segments 49 and 50 which are disposed on opposite sides of the arm 48. The arm 48 is connected by a conductor 51 to one terminal of the alternating current supply source 25. The contact segment 49 is connected by a conductor 52, in which one winding of the motor 44 is inserted, to the other terminal of the supply source 25, and the contact segment 50 is connected by a conductor 53, in which the other winding of the motor 44 is inserted, to the last mentioned terminal of the source 25.

With the arrangement described, when the arm 48 is intermediate the contact segments 49 and 50, the motor 44 is not energized for rotation in either direction, but when the arm 48 is in engagement with the contact segment 49 the motor 44 is energized for rotation in the direction to open the fuel valve 45 and thereby to increase the supply of fuel to the furnace 5. When the arm 48 is in engagement with the contact segment 50 the motor 44 is energized for rotation in the opposite direction to effect a closing adjustment of the valve 45 and thereby to decrease the supply of fuel to the furnace.

Although not shown the contact segments 49 and 50 of the switch 47 are desirably made adjustable relatively to each other and to the chart 13 so that both the sensitivity and the control point setting of the apparatus may be adjusted in a manner well known in the art.

In Figs. 2-4 I have illustrated more or less diagrammatically a preferred embodiment of my invention in which a suspension type galvanometer 1, comprising a horseshoe type permanent magnet 15 and a coil 16 suspended between the poles of the permanent magnet 15, is utilized. The coil 16 carries the pointer 2 and is suspended between the poles of the permanent magnet 15 by suitable suspension means indicated generally by the reference numeral 54. The construction of the galvanometer may desirably be the same as that disclosed in Patent 2,132,617, which issued October 11, 1938, to Thomas R. Harrison, with the exception that the end of the pointer 2 is provided with a contact pressure increasing coil 33, as is shown in detail in Fig. 3. As illustrated in Fig. 3 the end of the galvanometer pointer 2 has a forked shape, the lower tine 55 of which is adapted to be engaged by a pair of cooperating contact arms 56 and 57 which are disposed on opposite sides thereof and the upper tine 58 of which supports coil 33. The lower tine 55 may desirably comprise an extension of the galvanometer pointer 2 as shown in Fig. 3 and the upper tine 58 is connected to the pointer 2 by a resilient arm 59. While theoretically it would appear that the structure 55, 58 and 59 may be rigid, I have discovered that markedly improved results are obtained when the connecting member 59 between the galvanometer pointer 2 and the upper tine 58 is resilient. Whether the latitude of movement of the contact pressure increasing coil 33 is in a horizontal direction or a vertical direction does not appear to be materially important. A material factor seems to be the provision of a resilient connection between the coil 33 and the lower tine or contact 55. Satisfactory operation has been obtained when the connecting member 59 is a phosphor bronze strip 0.3125" long, 0.015" wide and 0.005" thick. In Fig. 3 the narrowest edge of the member 59 is seen so that the latitude in the movement of the coil 33 is in a vertical direction.

In Fig. 5 I have illustrated more or less diagrammatically an arrangement which may be employed alternatively to that shown in Fig. 3 for carrying the contact pressure increasing coil 33. As shown in Fig. 5 the coil 33 is carried by the upper tine 58 of the forked end of the pointer 2, which upper tine may comprise an extension of the pointer 2, and the lower tine or contact 55 is supported by the resilient member 59. The member 59 in Fig. 5 may desirably have the same dimensions as the corresponding part as in Fig. 3. In Fig. 5, however, the edge of the member 59 seen is that having the dimension 0.015" so that the latitude of movement of the coil 33 is in a horizontal direction.

Another factor which I have determined to be of importance in obtaining improved operation of the apparatus described is that of low impact upon contacting of the contact 55 by the contact arms 56 and 57. This requires the use of a contact pressure increasing and contact system having little weight and the application of contact pressure increasing forces that are not excessive. Too great a contact pressure increasing force produces bouncing or rebounding of the contact 55 from the arms 56 and 57 even with a light weight contacting system. In a practical embodiment of my invention satisfactory results have been obtained with a contacting system comprised of a coil 33 made up of 300 turns of #46 enamel covered wire having a resistance of 105 ohms, a connecting member 59 having the dimensions 0.3125", 0.015", 0.005" as mentioned above, and a contact member 55 having the dimensions 0.375", 0.032" and 0.005". In each of Figs. 3 and 5 the edge of the contact 55 seen is that having the dimension 0.032" so that the contact 55 is resilient in the horizontal direction.

Summing up I have determined that very good performance is attained with a light weight system and a condition of resiliency in the connecting member 59 and the contact 55 that represents a compromise between the definite positioning value of rigid members and the cushioning value of resilient members.

The contact arm 56 is mounted on the upper end of an arm 60, the latter of which is pivoted on a shaft 61 at a point intermediate its ends, and is insulated therefrom. Specifically, the contact arm 56 is rigidly connected by a screw 62 to the upper end of the arm 60 and is insulated from the latter by suitable insulating spacers 63. The arm 60 carries a roller 64 at its lower end, which roller bears against the edge of a cam 65. The cam 65 is rotated by a continuously rotating shaft 66, with which it is rigid, and is so configured that upon rotation thereof the arm 60 is oscillated about its pivot point 61 and thereby effects reciprocatory movement of the contact arm 56 from a position in which it just engages the contact 55, when the galvanometer pointer 2 is in its normal, neutral position, toward a position to the right of the contact 55, as seen in the drawings. The extent to which the contact arm 56 is moved away from the position first mentioned may be adjusted as desired by suitably configuring the cam 65 and choosing the length of the arm 60. The adjustment of the contact arm 56 to the position in which it just engages the galvanometer contact 55, when the latter is in its normal, neutral position and when the contact arm 56 is in its extreme position to the left may be adjusted by manipulation of a screw 67. To this end the arm 60 is comprised of two parts which are pivoted at 68 and which are adjustable relatively to each other about that pivot point by means of manipulation of the screw 67. The shaft 66 which carries the cam 65 is supported for rotation at the lower end of a bracket 69 which is mounted in any convenient manner at its upper end on the galvanometer structure.

As shown in Fig. 2, and as shown more in detail in Fig. 4 which discloses an enlarged view of the galvanometer pointer engaging mechanism, the contact arm 57 is carried by a member 70 which is pivoted for rotation on a shaft 71. The contact arm 57 is connected by a screw 72 to the member 70 and is insulated therefrom by suitable insulating washers 73. The member 70 is biased for rotation in a counter-clockwise direction about its pivot point 71 by a spring 74 and is adapted to be rotated against the opposing forces of the spring 74 in a clockwise direction upon movement of the arm 60 in a counter-clockwise direction about its pivot point 61.

To this end the arm 60 is provided with a projection 75 at its upper end, which projection carries a pin 76. The upper edge of the member 70 is biased by the spring 74 into engagement with the pin 76. Upon rotation of the arm 60 in the counter-clockwise direction and thereby movement of the contact arm 56 towards the left, the member 70 will be rotated in a clockwise direction about its pivot point 71 to thereby effect movement of the contact arm 57 towards the right.

When the galvanometer pointer 2 is in its normal, neutral position, the arms 56 and 57 will both engage the contact 55 on the end of the galvanometer pointer 2 at the same instant and therefore the arms 56 and 57 will be moved in opposite directions away from the contact 55. When the galvanometer pointer 2 is deflected from its normal, neutral position, one or the other of the contact arms 56 or 57 will engage the contact 55 and thereby move the pointer 2 back to its normal, neutral position.

As illustrated in Fig. 4, the coil 33 for increasing the contact pressure between the galvanometer pointer 2 and the contact arms 56 and 57 is disposed directly under the poles of a permanent magnet 40. The magnet 40 is rigidly connected in any convenient manner, as, for example, by a screw 77 to a bracket 78 which is carried by the galvanometer structure in any suitable manner.

In Fig. 6 I have illustrated more or less diagrammatically a modification of the mechanism disclosed in Fig. 2 for engaging the contact part 55 and thereby for restoring the galvanometer pointer 2 to its normal neutral position upon deflection of the galvanometer from that position in which means are provided for readily adjusting the sensitivity of the apparatus. That is to say, the modification disclosed in Fig. 6 includes provisions for readily adjusting the extent to which the contact arms 56 and 57 are deflected without disturbing the arm 60 or the cam 65.

Specifically in Fig. 6 a lever 79 is provided for adjusting the sensitivity of the apparatus. The arm 60 in this modification is pivoted on a fixed shaft 80 and is provided with a projection 82 which moves a pin 83 against a projection on the lower end of a member 81 which, as shown, carries the contact arm 56 and is pivoted on the shaft 61, and thereby effects oscillatory movement of the member 81 about the shaft 61 corresponding to the oscillatory movement imparted thereto by the cam 65. The angular movement so imparted to the member 81 upon a complete rotation of the cam 65 is adapted to be varied by varying the distance between the pin 83 and the shaft 61.

To this end the pin 83 is carried at the upper end of an arm 84 which is pivoted at its lower end to the end of a bell crank 85. The bell crank 85 is pivoted for rotation at 86 and is adapted to be given angular movement by adjusting the lever arm 79. The lever arm 79 is pivoted for rotation on a shaft 87 on which an eccentric 88 is rigidly mounted. The eccentric 88 is positioned within an elliptical opening 89 provided in the upper end of the bell crank 85 as seen in the drawings. It will be apparent that upon angular adjustment of the lever arm 79 the bell crank 85 will be given a corresponding angular adjustment and thereby the distance of the pin 83 from the shaft 61 will be varied accordingly. Thus, the extent to which the contact arms 56 and 57 are reciprocated on each complete rotation of the cam 65 and may be varied as desired simply by manipulation of the lever arm 79.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent is:

1. A system comprising a normally balanced electrical network, means for producing an unbalanced electromotive force in said network, a device adjustable to reduce said unbalanced electromotive force, motive means for adjusting said device, a device responsive to the state of balance of said network, said last mentioned device having a deflectable member which when said network is balanced assumes a predetermined position and upon unbalance of said network deflects away from said position, reciprocating members disposed on opposite sides of said deflectable member and adapted to engage said deflectable member when the latter is deflected from said predetermined position to return said deflectable member to said position, an electrical circuit adapted to be energized through contact of said deflectable member with said reciprocating members, means included in said circuit adapted to be selectively energized upon contact of said deflectable member with said reciprocating members to control said motive means, additional means operative upon contact of said deflectable member with said reciprocating members to increase the contact pressure therebetween to thereby ensure positive energization of said electric circuit, and means independent of said deflectable member and operated in synchronism with said reciprocating members to deenergize said electrical circuit before said deflecting member and said reciprocating members are separated.

2. A system comprising a normally balanced electrical network, means for producing an unbalanced electromotive force in said network, a device adjustable to reduce said unbalanced electromotive forces, motive means for adjusting said device, a galvanometer responsive to the state of balance of said network, said galvanometer having a deflectable pointer which when said network is balanced assumes a predetermined position and upon unbalance of said network deflects away from said position, reciprocating members disposed on opposite sides of said deflectable pointer and adapted to engage said pointer when the latter is deflected from said predetermined position to return said galvanometer pointer to said position, an electrical circuit adapted to be energized through contact of said galvanometer pointer with said reciprocating members, means included in said circuit adapted to be selectively energized upon contact of said galvanometer pointer with one or the other of said reciprocating members to control said motive means, additional means operative upon contact of said galvanometer pointer with said reciprocating members to increase the contact pressure therebetween to thereby ensure positive energization of said electric circuit, and means independent of said galvanometer pointer and operated in synchronism with said reciprocating members to deenergize said circuit before said galvanometer pointer and reciprocating members are separated.

3. A system comprising a normally balanced electrical network, means for producing an unbalanced electromotive force in said network, a device adjustable to reduce said unbalanced electromotive force, motive means for adjusting said device, a device responsive to the state of balance of said network, said last mentioned device having a deflectable member which when said network is balanced assumes a predetermined position and upon unbalance of said network deflects away from said position, reciprocating members disposed on opposite sides of said deflectable member and adapted to engage said deflectable member when the latter is deflected from said predetermined position to return said deflectable member to said position, an electrical circuit adapted to be energized through contact of said deflectable member with said reciprocating members, means included in said circuit adapted to be selectively energized upon contact of said deflectable member with one or the other of said reciprocating members to control said motive means, electrical means to increase the contact pressure between said deflectable member and the reciprocating member in contact therewith to thereby ensure positive energization of said electrical circuit, and means independent of said deflectable member and operated in synchronism with said reciprocating members to deenergize said electrical circuit before said deflecting member and said reciprocating members are separated.

4. A system comprising a normally balanced electrical network, means for producing an unbalanced electromotive force in said network, a device adjustable to reduce said unbalanced electromotive force, motive means for adjusting said device, a device responsive to the state of balance of said network, said last mentioned device having a deflectable member which when said network is balanced assumes a predetermined position and upon unbalance of said network deflects away from said position, reciprocating members disposed on opposite sides of said deflectable member and adapted to engage said deflectable member when the latter is deflected from said predetermined position to return said deflectable member to said position, means responsive to contact of said deflectable member with said reciprocating members to control said motive means, and electrical means including a coil resiliently supported by said deflecting member and magnetic means cooperatively associated with said coil to increase the contact pressure between said deflectable member and the reciprocating member in contact therewith to thereby ensure positive operation of said responsive means.

5. A system comprising a normally balanced electrical network, means for producing an unbalanced electromotive force in said network, a device adjustable to reduce said unbalanced electromotive force, motive means for adjusting said device, a device responsive to the state of balance of said network, said last mentioned device having a deflectable member which when said network is balanced assumes a predetermined position and upon unbalance of said network deflects away from said position, a resilient part provided on the end of said deflectable member, reciprocating members disposed on opposite sides of said resilient part and adapted to engage said resilient part when said deflectable member is deflected from said predetermined position to return said deflectable member to said position, means responsive to contact of said resilient part with said reciprocating members to control said motive means, and electrical means including a coil resiliently supported by said deflectable member and magnetic means cooperatively associated with said coil to increase the contact pressure between said resilient part and the reciprocating member in contact therewith to thereby ensure positive operation of said responsive means.

6. A system comprising a normally balanced electrical network, means for producing an unbalanced electromotive force in said network, a device adjustable to reduce said unbalanced electromotive force, motive means for adjusting said device, a device responsive to the state of balance of said network, said last mentioned device having a deflectable member which when said network is balanced assumes a predetermined position and upon unbalance of said network deflects away from said position, a resilient contact part carried by said deflectable member, reciprocating members disposed on opposite sides of said resilient contact part and adapted to engage said resilient contact part when said deflectable member is deflected from said predetermined position to return said deflectable member to said position, means responsive to contact of said resilient contact part with said reciprocating members to control said motive means, electrical means including a coil carried by said deflectable member, and magnetic means cooperatively associated with said coil to increase the contact pressure between said resilient contact part and the reciprocating member in contact therewith to thereby ensure positive operation of said responsive means, and a resilient connection between said resilient contact part and said coil.

7. The combination with the deflectable member of a galvanometer, of reciprocating members disposed on opposite sides of said deflecting member and adapted to engage said deflectable member when the latter is deflected from a predetermined position for returning said deflectable member to said position, an electric circuit controlled by the contact between said deflecting member and said reciprocating member, and electromagnetic means energized by engagement of said deflectable member and the reciprocating member engaged to establish firm contact therebetween to thereby ensure positive control of said electric circuit, said electromagnetic means including a coil carried by said deflectable member and magnetic means associated with said coil.

8. The combination with the deflectable member of a galvanometer, of a cyclically operating device for returning said deflectable member towards a predetermined position upon deflection therefrom, an electric circuit controlled by the contact between said member and device, electromagnetic means energized by engagement of said member and device to establish firm contact therebetween to thereby ensure positive control of said electric circuit, said electromagnetic means including a coil associated with said galvanometer, and means independent of said deflectable member and operated in synchronism with said cyclically operated device to deenergize said electric circuit before said deflectable member and said device are separated.

9. The combination of claim 8 wherein said deflectable member is provided with a resilient part on the end thereof which is adapted to be engaged by said cyclically operating device and said coil is resiliently supported by said deflectable member.

10. The combination of claim 8 wherein a resilient part is carried by said deflectable member, which part is adapted to be engaged by said cyclically operating device and said coil is supported by said deflectable member, and including a resilient connection between said resilient part and said coil.

11. The combination with the deflecting member of a galvanometer, of a cyclically operating device for returning said deflecting member towards a predetermined position upon deflection therefrom, an electric circuit controlled by the contact between said member and device, and electromagnetic means including inductively related coil and magnetic elements arranged to be actuated upon engagement of said member and device to create a physical force to establish firm contact between said deflecting member and said device to ensure positive control of said electric circuit.

12. The combination with the deflectable member of a galvanometer of reciprocating members disposed on opposite sides of said deflecting member and adapted to engage said deflecting member when the latter is deflected from a predetermined position for returning said deflectable member to said position, an electric circuit controlled by contact between said deflectable member and said reciprocating members, and electrical means to establish firm contact between said deflectable member and the reciprocating member engaged to thereby ensure positive control of said electric circuit, said electrical means including a coil carried by said deflectable member and relatively stationary magnetic means associated with said coil.

13. The combination with the deflectable member of a galvanometer, of a cyclically operating device for returning said deflectable member towards a predetermined position upon deflection therefrom, an electric circuit controlled by contact between said member and said device, electrical means to establish firm contact between said member and said device to thereby ensure positive control of said electric circuit, said electrical means including a coil associated with said galvanometer, and means independent of said deflecting member and operated in synchronism with said cyclically operating device to deenergize said electric circuit before said deflectable member and said device are separated.

14. The combination with a deflectable member of a galvanometer, of a device periodically moved toward said member and adapted to return the latter to a predetermined position upon deflection of said member from said position, and electrical means operative upon engagement of said member and said device to establish firm contact therebetween, said electrical means including a coil arranged to be energized upon engagement of said deflecting member and said device and a magnetic element inductively related to said coil to create a physical force between said deflecting member and said device to establish firm contact between said deflecting member and said device upon engagement therebetween.

15. The combination with the deflectable member of a galvanometer, of a device periodically moved toward said member and adapted to return the latter to a predetermined position when it is deflected therefrom, and electrical means to establish firm contact between said member and device, said electrical means including a coil carried by said deflecting member and a stationary magnetic element which is inductively related to said coil to establish firm contact between said member and device upon engagement therebetween.

16. The combination with the deflectable member of a galvanometer, of a resilient part carried by said deflectable member, a device periodically moved toward said resilient part and adapted to engage said resilient part to return said deflectable member to a predetermined position when the latter is deflected therefrom, electrical means to establish firm contact between said resilient part and said device, said electrical means including a coil carried by said deflecting member and stationary magnetic means associated with said coil, and a resilient connection between said resilient part and said coil.

EARL A. KEELER.